(12) United States Patent
Dönges et al.

(10) Patent No.: US 10,072,775 B2
(45) Date of Patent: Sep. 11, 2018

(54) CONICAL SCREW CONNECTION FOR A FUEL LINE

(71) Applicant: Siemens Aktiengesellschaft, Munich (DE)

(72) Inventors: Ulrich Dönges, Duisburg (DE); Peter Kroner, Monheim am Rhein (DE); Werner Hesse, Haltern am See (DE); Falk Seidel, Hamminkein (DE); Gerd Weber, Dinslaken (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/120,144

(22) PCT Filed: Feb. 12, 2015

(86) PCT No.: PCT/EP2015/052925
§ 371 (c)(1),
(2) Date: Aug. 19, 2016

(87) PCT Pub. No.: WO2015/132056
PCT Pub. Date: Sep. 11, 2015

(65) Prior Publication Data
US 2017/0219138 A1    Aug. 3, 2017

(30) Foreign Application Priority Data

Mar. 3, 2014    (DE) .................. 10 2014 203 817

(51) Int. Cl.
*F16L 19/02* (2006.01)
*F16L 19/025* (2006.01)
(Continued)

(52) U.S. Cl.
CPC .......... *F16L 19/0212* (2013.01); *F02C 7/222* (2013.01); *F02C 7/28* (2013.01);
(Continued)

(58) Field of Classification Search
CPC ............... F16L 19/0212; F16L 19/0218; F16L 19/0243; F16L 19/04; F16L 19/041; F16L 19/046
(Continued)

(56) References Cited

U.S. PATENT DOCUMENTS 541,736 A * 6/1895 Friede ..................... F16L 19/04
                                                                        285/339
714,726 A * 12/1902 Marsh ................. F16L 19/0218
                                                                        285/354
(Continued)

FOREIGN PATENT DOCUMENTS

CN    1699739 A    11/2005
CN    1880824 A    12/2006
(Continued)

OTHER PUBLICATIONS

International Standard ISO 8434-1:2007; "Metallic tube connections for fluid power and general use", Second Edition, Sep. 1, 2007.
(Continued)

*Primary Examiner* — David Bochna
(74) *Attorney, Agent, or Firm* — Beusse Wolter Sanks & Maire

(57) ABSTRACT

A fuel line of a turbo-machine having a conical screw connection, wherein the conical screw connection has at least one screw socket into which a sealing cone having a sealing cone surface and a sealing cone face of a screw connection body connected thereto is interlockingly inserted, and screw socket and screw connection body are directly or indirectly screwed to each other, wherein the sealing cone has a metallic, flat sealing element which is received in a receptacle of the sealing cone surface, wherein the flat sealing element is a metal which is softer than the material of the sealing cone.

13 Claims, 3 Drawing Sheets

(51) Int. Cl.
*F02C 7/22* (2006.01)
*F02C 7/28* (2006.01)

(52) U.S. Cl.
CPC ........ *F16L 19/025* (2013.01); *F05D 2220/32* (2013.01); *F05D 2250/232* (2013.01); *F05D 2260/30* (2013.01); *F05D 2300/141* (2013.01)

(58) Field of Classification Search
USPC .......................................... 285/389, 386, 354
See application file for complete search history.

(56) References Cited

U.S. PATENT DOCUMENTS

| | | | | |
|---|---|---|---|---|
| 839,090 | A * | 12/1906 | Ayer | F16L 19/04 285/354 |
| 954,549 | A * | 4/1910 | Turner | F16L 19/0218 285/354 |
| 959,702 | A * | 5/1910 | Blanchard et al. | F16L 19/04 285/354 |
| 1,301,245 | A * | 4/1919 | Fox | F16L 19/04 285/288.5 |
| 2,362,686 | A * | 11/1944 | De Lano | F16L 19/04 285/349 |
| 2,424,727 | A * | 7/1947 | Wenk | F16L 19/04 285/348 |
| 3,139,294 | A * | 6/1964 | Richards, Jr. | F16L 19/046 285/379 |
| 3,482,859 | A * | 12/1969 | Bowlin | F16L 21/035 285/332.3 |
| 3,628,815 | A * | 12/1971 | King | F16L 19/041 285/334.4 |
| 3,635,499 | A * | 1/1972 | Reddy | F16L 19/046 285/334.5 |
| 4,570,981 | A * | 2/1986 | Fournier | F16L 19/0218 285/354 |
| 5,169,182 | A | 12/1992 | Hashimoto | |
| 5,503,438 | A * | 4/1996 | Swauger | F16L 19/0218 285/354 |
| 5,507,531 | A * | 4/1996 | Aldridge | F16L 19/0218 285/354 |
| 5,518,279 | A * | 5/1996 | Harle | F16L 19/0218 285/354 |
| 2005/0275218 | A1 | 12/2005 | Asada et al. | |
| 2005/0284447 | A1 | 12/2005 | Usui et al. | |
| 2006/0284421 | A1 | 12/2006 | Fonville et al. | |
| 2008/0272550 | A1* | 11/2008 | Topping | F16L 19/041 277/314 |
| 2010/0194096 | A1 | 8/2010 | Seifert et al. | |
| 2014/0345736 | A1* | 11/2014 | Deane | F16L 19/0212 138/109 |

FOREIGN PATENT DOCUMENTS

| | | | |
|---|---|---|---|
| DE | 2631984 | A1 | 1/1978 |
| DE | 4116540 | A1 | 11/1991 |
| DE | 4116540 | C2 | 3/2001 |
| DE | 102005028188 | A1 | 2/2006 |
| DE | 102005010738 | A1 | 9/2006 |
| DE | 102010004918 | A1 | 8/2010 |
| DE | 102005063545 | B4 | 12/2013 |
| GB | 1816 | * 6/1912 | ............. F16L 19/04 |
| JP | 2007309232 | A | 11/2007 |
| JP | 5169182 | B2 | 3/2013 |
| WO | 2007105660 | A1 | 9/2007 |

OTHER PUBLICATIONS

DIN Deutsches Institut füNormung e.V., Berlin, Beuth Verlag GmbH, 10772 Berlin, Germany, DIN EN ISO 6508-1:2006-03, Metallic Materials—Rockwell Hardness Test; 2006.
International Search Report, dated Apr. 28, 2015, for PCT application No. PCT/EP2015/052925.
DE Search Report, dated Nov. 10, 2014, for DE application No. 102014203817.0.
CN search Report dated Feb. 1, 2018, for CN patent application No. 201580011236.8.

* cited by examiner

CONICAL SCREW CONNECTION FOR A FUEL LINE

CROSS REFERENCE TO RELATED APPLICATIONS

This application is the U.S. National Stage of International Application No. PCT/EP2015/052925 filed Feb. 12, 2015, and claims the benefit thereof. The International Application claims the benefit of German Application No. DE 102014203817.0 filed Mar. 3, 2014. All of the applications are incorporated by reference herein in their entirety.

FIELD OF INVENTION

The present invention relates to a fuel line of a turbomachine, having a conical screw connection, and to a sealing cone comprised by a conical screw connection of said type, and to an areal sealing element.

BACKGROUND OF INVENTION

In the case of turbomachines, conical screw connections are used in a fuel line as standard in order to make it possible, in particular, to realize a geometric arrangement of the fuel line on the outer side of the burner of the turbomachine without problems. In the case of the applicant's gas turbines, use is made, for example, of 24° conical screw connections conforming to ISO 8434-4.

In the presence of the high operating temperatures that typically arise in turbomachines, fuel lines, or conical screw connections comprised by such fuel lines, and the individual parts thereof are likewise exposed to relatively high temperatures and large temperature fluctuations. For this reason, it is normally the case that no soft material seals are used for such conical screw connections, because such seals would not be capable of withstanding the high temperatures, or excessively fast aging of such seals would occur. The conical screw connections that are thus typically used in the case of the fuel lines have a metallic sealing cone which is inserted into a likewise metallic screw connection piece with a form fit, wherein said sealing cone and screw connection piece may additionally be screwed together to form a sealed closure. A conical screw connection of said type is known for example from DE 10 2005 028 188 A1. The sealing action of the two metallic components which are in contact by way of the sealing surfaces is normally adequate in the newly constructed state. However, said sealing action deteriorates over the course of the operating duration, predominantly owing to the vibrations that occur during operation. Likewise, the sealing action deteriorates owing to actions arising from the assembly process, differential temperature expansions and insufficiently appropriate handling of the fuel lines, as a result of which the sealing action falls to below an admissible level after a certain period of usage.

Said deteriorated sealing action between the sealing cone and screw connection piece gives rise to leaks, which must be avoided. The prior art counteracts said leaks after a sufficiently long period of usage on the one hand through replacement of the sealing cone, by virtue of said sealing cone being cut off from the screw connection body which comprises it and a new sealing cone being welded onto the remaining screw connection body. To be able to ensure the sealing action of the welded connection between the new sealing cone and new screw connection body, nondestructive weld seam testing must be performed. Both the cutting of the sealing cone from the screw connection body and the replacement thereof with a new seal cone which must be welded on involve expenditure of work which necessitates a large amount of time and costs and material.

On the other hand, the prior art proposes, as described for example in DE 41 16 540 C2, that loose seals be placed into the screw connection piece, which seals are then compressed by the sealing cone and the screw connection piece in order to impart a sealing action. A problem with this approach is however the lack of accuracy with which such loose seals can be inserted into the screw connection pieces. Specifically, practice has shown that even a slightly eccentrically inserted seal leads to a non-uniform arrangement of the seal even in the compressed state, and thus an inadequate sealing action. Specifically in the case of fuel lines which are charged with high pressures, however, such an inadequate sealing action constitutes a safety risk, which must be avoided.

SUMMARY OF INVENTION

It is an object of the present invention to avoid said disadvantages known from the prior art. In particular, it is an object of the present invention to propose a fuel line, or a conical screw connection comprised by said fuel line or the components of said conical screw connection, which can eliminate the need for replacement of the sealing cone by cutting it off and welding on a replacement sealing cone. It is likewise sought to ensure as reliable as possible a sealing action. It is thus also an object of the invention to propose a more reliable and inexpensive conical screw connection which requires relatively little outlay in terms of maintenance.

Said objects on which the invention is based are achieved by way of a fuel line, and by way of a sealing cone and an areal sealing element as claimed.

In particular, said objects on which the invention is based are achieved by way of a fuel line of a turbomachine, having a conical screw connection, wherein the conical screw connection has at least one screw connection piece into which a sealing cone with a sealing cone surface and with a sealing cone face side, adjoining said sealing cone surface, of a screw connection body is inserted with a form fit, and the screw connection piece and screw connection body are directly or indirectly screwed together, wherein the sealing cone has a metallic, areal sealing element which is received in a receptacle of the sealing cone surface, wherein the areal sealing element comprises a metal which is softer than the material of the sealing cone.

Furthermore, the objects on which the invention is based are achieved by way of a sealing cone having a sealing cone surface and having a sealing cone face side, adjoining said sealing cone surface, of a screw connection body, in particular as per a conical screw connection as described above and below, wherein the sealing cone has a metallic, areal sealing element which is received in a receptacle of the sealing cone surface, wherein the areal sealing element comprises a metal which is softer than the material of the sealing cone.

Furthermore, the objects on which the invention is based are achieved by way of an areal sealing element for arrangement in a receptacle of a sealing cone surface of a sealing cone of a screw connection body as per a conical screw connection as described above and below, wherein the sealing element is metallic and the sealing element can be mounted on the sealing cone without the provision of a fastening means between these.

According to the invention, it is provided that the areal sealing element comprises a metal which is softer than the metal of the sealing cone itself. The hardness of the material is in this case defined for example in accordance with the hardness scales customary for the material and conforming to EN ISO 6508-1, wherein the units of Rockwell, for example, may be used. Through the provision of a relatively soft areal sealing element, said sealing element can, when contact is established between the screw connection piece and the screw connection body, easily mold onto the counterpart surface in order to thereby realize a particularly good sealing action. Thus, it is for example not necessary for the screw connection body or the sealing cone itself to be produced from an adequately soft metal, because the sealing action can be imparted in particular entirely by the areal sealing element. As a result, the screw connection body may possibly also be manufactured from a hard material, which is for example better adapted to the occurring temperature fluctuations in the case of a fuel line of a turbomachine. It is also ensured that the areal sealing element is inserted substantially correctly and in a centered manner into the screw connection piece, such that an adequately reliable sealing action can be achieved even after the clamping of sealing cone and screw connection piece.

At this juncture, it should be pointed out that the conical screw connection is comprised by the fuel line according to the invention. The conical screw connection has at least one screw connection piece and one screw connection body, which can be directly or indirectly screwed together in order thereby to be able to form a flow delimitation in the sense of a line section, which is suitable for conducting fuel. The fuel line according to the invention may thus be identical to a conical screw connection, or may comprise such a conical screw connection as a constituent part. Further flow delimiting sections, that is to say line sections, thus no longer need to be included.

The screw connection piece and screw connection body may be directly or indirectly screwed together. A direct screw connection of the two components requires a direct connection of the two components by way of a suitable screw thread. An indirect connection of the two components permits a fastening thereof by way of possible further components, such as a sleeve nut, which is screwed only to one of the two components.

At this juncture, it is likewise pointed out that the sealing cone surface according to the invention is formed as a lateral, outwardly pointing sealing surface of the sealing cone. Here, in particular, the sealing cone surface does not comprise the sealing cone face side which forms the end-side termination of the sealing cone. The sealing cone surface and sealing cone face side may transition into one another without edges. The form fit between sealing cone and screw connection piece is in this case typically formed by the sealing cone surface and a suitable counterpart surface of the screw connection piece. It is likewise possible for the sealing surface to also comprise further surface sections of the sealing cone, in particular of the sealing cone face side.

The receptacle, comprised by the sealing cone, for the metallic, areal sealing element is provided for securely receiving the areal sealing element on the sealing cone. The areal sealing element thus covers a part of the sealing cone surface and, after being correspondingly received, serves for forming a sealed closure by way of a form fit with a suitable counterpart surface of the screw connection piece. Here, the receptacle is in particular in the form of a recess onto which or into which the areal sealing element can be inserted.

According to the invention, therefore, the sealing action of the conical screw connection is ensured not by the direct material contact of sealing cone and screw connection piece but by the material contact between, on the one hand, the sealing cone and the areal sealing element and, on the other hand, between the areal sealing element and the corresponding counterpart surface of the screw connection piece. Owing to the provision of the metallic areal sealing element, it can firstly be ensured that the seal is not subject to excessive aging of the seal between sealing cone and screw connection piece even in the presence of high temperatures such as are encountered inter alia in turbomachines.

Furthermore, the metallic areal sealing element can also advantageously compensate unevennesses of the metallic contact surfaces of sealing cone and counterpart surface of the screw connection piece. For example, scratches on or minor deformations of or other damage to said surfaces can be compensated by way of the metallic areal sealing element by virtue of said sealing element correspondingly molding on.

Furthermore, according to the invention, it is no longer necessary, after the occurrence of leaks between the sealing surfaces after a corresponding period of usage of the conical screw connection, for the sealing cone to be cut off from the screw connection body and replaced with a new sealing cone. Rather, it is now merely necessary for the metallic areal sealing element to be removed from the sealing cone and replaced with a new areal sealing element. The sealing cone can thus remain connected to the screw connection body. As a result, there is no need for cumbersome replacement of the sealing cone by welding, as a result of which time, money and material can be saved.

According to a first embodiment of the fuel line according to the invention, it is provided that the areal sealing element extends, in its extent in the longitudinal direction of extent of the sealing cone, as far as the transition from the sealing cone surface to the sealing cone face side adjoining said sealing cone surface. The longitudinal direction of extent of the sealing cone corresponds in this case to the flow direction of the fuel flow conducted through the screw connection body. The transition from sealing cone surface to the sealing cone face side adjoining said sealing cone surface is in this case typically formed by an edge region between these. Said edge region may for example be in the form of a sharp edge or in the form of a rounded edge. Owing to the extent of the areal sealing element as far as the transition of the sealing cone surface to the sealing cone face side, it is thus possible for an already pre-shaped areal sealing element to be easily mounted onto the sealing cone. In particular, the areal sealing cone element is provided for insertion into a recess of the sealing cone surface, and can thus produce a contact closure with adequate sealing action between the cutout surface and the areal sealing element. According to the embodiment, it is thus possible for the already pre-shaped areal sealing element to be mounted, correspondingly to a cap, onto an end region of the sealing cone without the need for the areal sealing element to undergo further shape adaptations. This facilitates both the mounting and the exchange of the areal sealing element.

In one refinement of said concept, it is provided that the areal sealing element furthermore has a deformation section which is integrally formed at the transition from the sealing cone surface to the sealing cone face side adjoining said sealing cone surface. It is thus possible for a continuously areal transition between the sealing cone surface and sealing cone face side to be placed in contact with the areal sealing element, such that said sealing element can extend from the sealing cone surface to the sealing cone face side. In this way, easier centering and fitting of the areal sealing element during the mounting and during replacement thereof can be realized. In particular, the deformation section of the areal sealing element is received by a suitably adapted receptacle of the sealing cone face side and of the sealing cone surface. Said receptacle may in this case also be in the form of a suitable cutout.

In a further embodiment of the fuel line according to the invention, it is provided that the areal sealing element has a substantially uniform thickness which is in particular no greater than 1.0 mm. Owing to this thickness configuration, it is thus possible for suitable metal sheets to be deformed to form an areal sealing element. Owing to the maximum thickness of 1.0 mm, it is furthermore possible particularly for material to be conserved and thus costs to be saved.

In a further embodiment of the invention, it is provided that the areal sealing element has, as its greatest material fraction, a high-grade metal, in particular silver. High-grade metals are relatively soft and flexible in relation to other metals and are chemically inert with respect to most substances. Thus, high-grade metals are particularly suitable for use in a fuel line, in the case of which, owing to the high temperatures and the reactivity of the fuel conducted therein, the chemical reactivity is also an essential technical feature. Silver is furthermore relatively inexpensive in relation to numerous other high-grade metals, and is easy to machine. Thus, silver is particularly suitable as the greatest material fraction in the areal sealing element.

In a further embodiment of the fuel line according to the invention, it may be provided that the areal sealing element extends over the sealing cone surface only over those surface regions which are provided for the form fit with the screw connection piece. As a result, the areal sealing element can, on the one hand, be used entirely for the sealing action to be achieved, but requires no wastage of material, because only those surface regions which are provided for effecting the sealing action are occupied by the areal sealing element.

In a further embodiment of the invention, it is provided that the areal sealing element is mounted onto the sealing cone without the provision of a fastening means between these. In this way, it is firstly the case that the mounting of the areal sealing element onto the sealing cone is made easier, as is the replacement of the areal sealing element in the event of maintenance. In the event of maintenance, it is possible in particular for the areal sealing element to be removed from the sealing cone relatively easily and without the use of further apparatus. For example, it is sufficient for the areal sealing element to be pulled off the sealing cone for example using a blade.

The invention will be described in detail below on the basis of individual figures. Here, it is pointed out that the figures are to be understood merely as being schematic and are not intended to constitute a restriction with regard to the practicability of the invention.

It is also pointed out that the technical features with the same reference designations have the same technical effects.

The technical features illustrated below are furthermore claimed in any combination with one another, where the combination is suitable for solving the problem on which the invention is based.

DETAILED DESCRIPTION OF INVENTION

Figure 1:
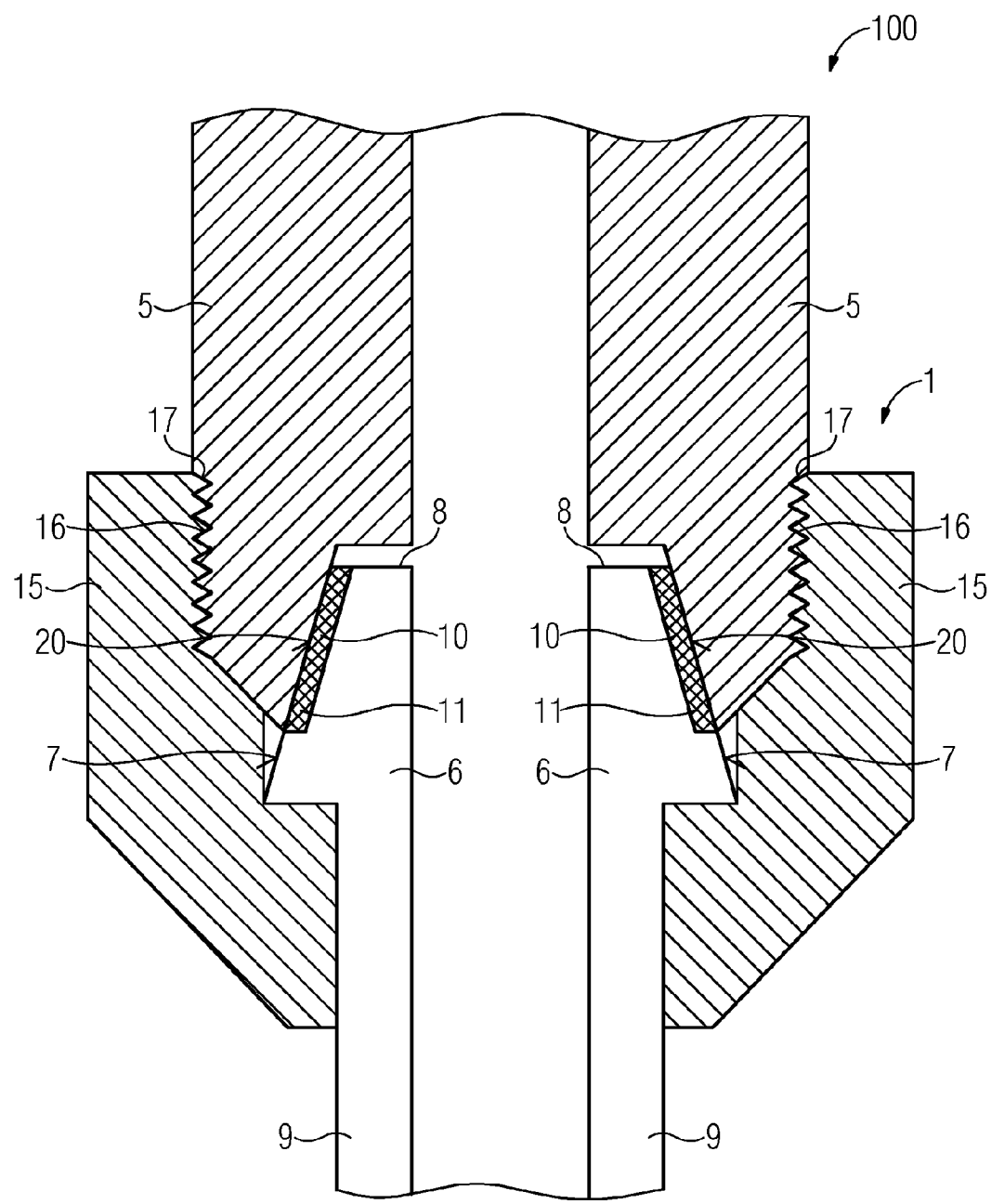
FIG. 1 shows a lateral sectional view of an embodiment of the fuel line 100 according to the invention with conical screw connection 1.

FIG. 1 shows a lateral sectional view through a fuel line 100 with conical screw connection 1. The conical screw connection 1 comprises in this case a screw connection piece 5 which is indirectly screwed to a screw connection body 9. For the indirect screw connection, a sleeve nut 15 is provided which, by way of a first thread 16, is screwed together with a second thread 17 of the screw connection piece. Owing to the screw connection of the two components, the screw connection body 9, which comprises the sealing cone 6, can be clamped to the screw connection piece 5. The clamping gives rise to form-fitting pressing contact between the sealing cone 6 and a counterpart surface (not denoted in any more detail by a reference designation) of the screw connection piece 5, whereby a sealing action between the two components is realized. (For better illustration of the individual parts, these are shown in an exploded illustration, and therefore the direct contact is not explicitly illustrated in the present case).

The conical screw connection 1 has a sealing cone 6 with a sealing cone surface 7 and with a sealing cone face side 8 adjoining said sealing cone surface. The sealing cone surface 7 furthermore has a receptacle 11 in which or on which there is mounted a metallic, areal sealing element 10. The areal sealing element 10 extends in this case over those subregions of the sealing cone surface 7 which are provided for a form fit with the corresponding counterpart surface of the screw connection piece 5.

It is pointed out at this juncture that, in the context of the invention, the metallic areal sealing element 10 should be regarded as part of the sealing cone 6, as regards the sealed closure between sealing cone 6 and screw connection piece 5. In this respect, no inconsistencies should arise where reference is made to a sealing action between the sealing cone 6 or the sealing cone surface 7 and the screw connection piece 5. Here, it is clear to a person skilled in the art that a sealing action of said type is, according to the invention, imparted primarily by the metallic areal sealing element 10, the hardness of which is furthermore lower than the hardness of the material of the sealing cone 6.

When the conical screw connection 1 is closed, that is to say the screw connection piece and screw connection body 9 are clamped to one another by way of the sleeve nut, the areal sealing element 10 is, as a result of the pressing action of the sealing cone 6 and of a suitable counterpart surface of the screw connection piece 5, molded onto corresponding surface sections. A particularly efficient sealing action is imparted in this way.

According to the embodiment, it is also provided that the areal sealing element extends, in its extent in the longitudinal direction of extent of the sealing cone 6, as far as the transition from the sealing cone surface 7 to the face side 8 adjoining said sealing cone surface. Consequently, the areal sealing element can for example be formed as a cone and mounted on the sealing cone 6. Here, both components require no further connecting means, because the interference fit between the sealing cone 6 and screw connection piece 5 can ensure adequate strength of the connection between sealing cone 6 and areal sealing element 10.

Figure 2:
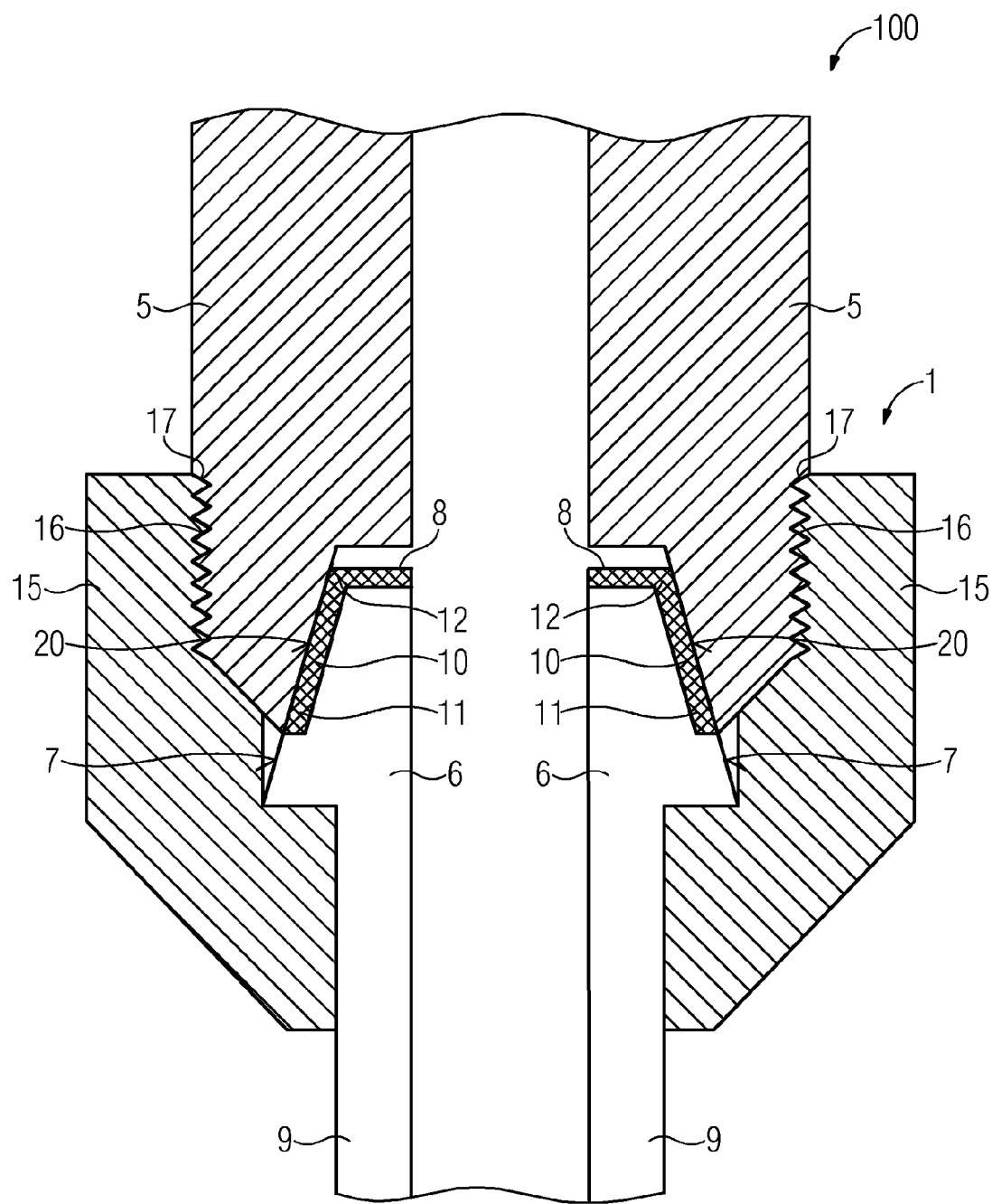
FIG. 2 shows a further embodiment of the fuel line 100 according to the invention with conical screw connection 1 in a lateral sectional view.

FIG. 2 shows a further embodiment of the fuel line 100 according to the invention in a lateral sectional view. Here, the embodiment shown in FIG. 2 differs from the embodiment shown in FIG. 1 merely in that the areal sealing element 10 has a deformation section 12 which is integrally formed at a transition from the sealing cone surface 7 to the sealing cone face side 8 adjoining said sealing cone surface. The areal sealing element thus forms a continuous deformed surface section which extends from the sealing cone surface to the sealing cone face side. An advantage of this embodiment is that easier centering and fitting of the areal sealing element 10 thus formed in relation to the sealing cone 6 are realized.

In an embodiment which is not shown in any more detail, it may also be provided that the areal sealing element 10 on the sealing cone face side 8 extends not over the entire sealing cone face side 8 but is provided only in a cut-out partial region.

Figure 3:
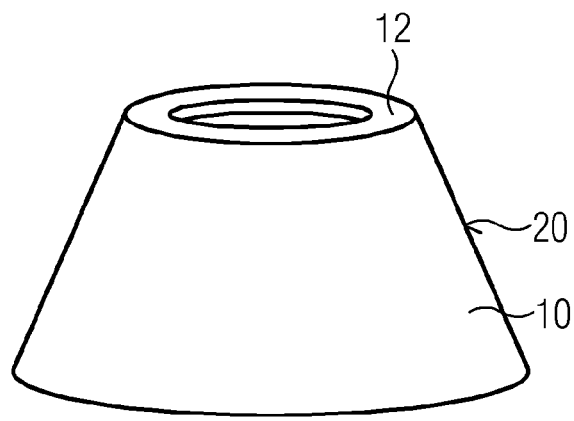
FIG. 3 shows a perspective side view of an areal sealing element 10 such as may be used for example in an embodiment of the conical screw connection 1 as per FIG. 2.

FIG. 3 shows a lateral perspective view of an areal sealing element 10 according to the invention, which is of conical form. Furthermore, the conical areal sealing element 10 has a deformation section 12 which is provided for mounting on a sealing cone face side 8 (not shown in the present case). The embodiment of the areal sealing element 10 shown in FIG. 3 may for example be mounted on a sealing cone 6 such as is shown in the embodiment of FIG. 2. Here, the outer side of the areal sealing element 10 forms a contact surface 20 which is provided for forming a form fit with a suitable counterpart surface of the screw connection piece 5.

Figure 4:
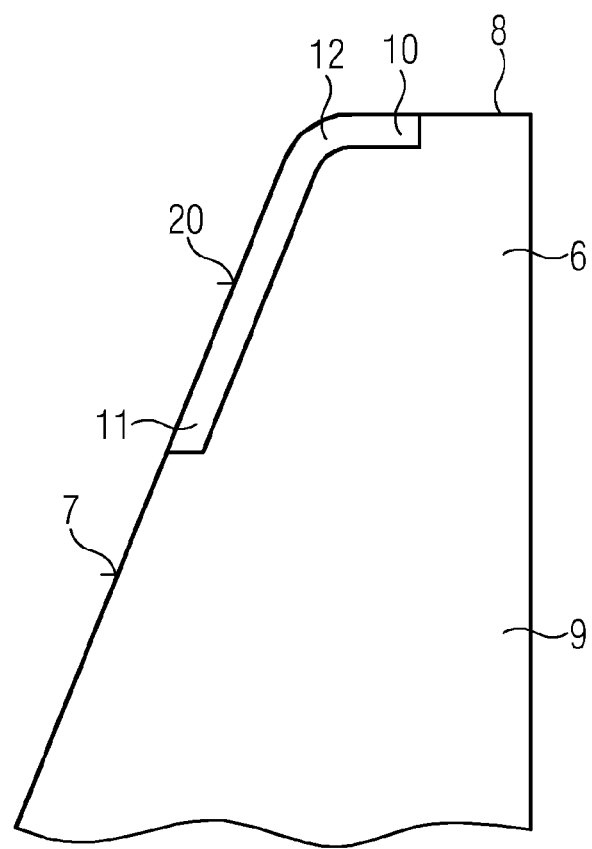
FIG. 4 shows a lateral sectional view through a subregion of a sealing cone 6 as per a further embodiment of the invention.

FIG. 4 shows a further embodiment of a sealing cone 6 according to the invention in a lateral sectional view. The region shown comprises merely the sealing cone surface 7 and the sealing cone face side 8, which are encompassed by the sealing cone 6 of the screw connection body 9. Furthermore, the sealing cone surface 7 has a receptacle 11 which is in the form of a recess and into which an areal sealing element 10 is mounted or inserted. Likewise, the sealing cone face side 8 has a recess (not denoted by a reference designation) which adjoins said sealing cone face side, such that a further section of the areal sealing element 10 can be received by said recess. The areal sealing element 10 furthermore has a deformation section 12 which is formed such that that it molds onto the surface of the recess of sealing cone surface 7 and sealing cone face side 8. The areal sealing element 10 is thus formed as an integral constituent part of the sealing cone 6 without a projecting length. To impart the sealing action, the areal sealing element 10 has an outwardly directed contact surface 20 which can be pressed together with a suitable counterpart surface of a screw connection piece 5 (not shown in any more detail) in order to effect a sealing action by way of a form fit. It is likewise possible for the deformation section 12, or that section of the areal sealing element 10 which is assigned to the sealing cone face side 8, to impart a sealing action.

Further embodiments will emerge from the subclaims.

The invention claimed is:

1. A fuel line of a turbomachine, comprising:
a conical screw connection and a sealing cone, wherein the conical screw connection comprises a screw connection piece into which the sealing cone, comprising a sealing cone surface and a sealing cone face side adjoining said sealing cone surface, of a screw connection body is inserted with a form fit, and the screw connection piece and the screw connection body are directly or indirectly screwed together,
wherein the sealing cone comprises a base portion and a tip portion, and a metallic areal sealing element which is received in a receptacle in the tip portion only,
wherein an outer surface of the base portion and an outer surface of the areal sealing element together define the sealing cone surface and also together define a constant external taper of the sealing cone,
wherein the areal sealing element comprises a metal which is softer than a material of the sealing cone, and
wherein the areal sealing element extends over the sealing cone surface only over those surface regions which are provided for the form fit with the screw connection piece.

2. The fuel line as claimed in claim 1,
wherein the areal sealing element extends, in its extent in a longitudinal direction of an extent of the sealing cone, as far as a transition from the sealing cone surface to the sealing cone face side adjoining said sealing cone surface.

3. The fuel line as claimed in claim 2,
wherein the areal sealing element comprises a deformation section which is integrally formed at the transition.

4. The fuel line as claimed in claim 1,
wherein the areal sealing element comprises a substantially uniform thickness which is no greater than 1.0 mm.

5. The fuel line as claimed in claim 1,
wherein the areal sealing element comprises.

6. The fuel line as claimed in claim 1,
wherein the areal sealing element is mounted onto the sealing cone without the provision of a fastening means therebetween.

7. A sealing cone comprising:
a sealing cone surface and having a sealing cone face side, adjoining said sealing cone surface, of a screw connection body, as claimed in claim 1,
wherein the sealing cone comprises a metallic, areal sealing element which is received in a receptacle of the sealing cone surface, wherein the areal sealing element comprises a metal which is softer than the material of the sealing cone,
wherein the areal sealing element extends over the sealing cone surface only over those surface regions which are provided for the form fit with the screw connection piece.

8. An areal sealing element for arrangement in a receptacle of a sealing cone surface of a sealing cone of a screw connection body as claimed in claim 1,
wherein the areal sealing element is metallic and the areal sealing element is mounted on the sealing cone without the provision of a fastening means between these,
wherein the areal sealing element extends over the sealing cone surface only over those surface regions which are provided for the form fit with the screw connection piece.

9. The fuel line as claimed in claim 1, wherein the sealing cone comprises a male cone, and wherein the screw connection piece comprises a female cone into which the sealing cone fits.

10. The fuel line as claimed in claim 9, further comprising a sleeve nut comprising female threads, wherein the screw connection piece further comprises male threads configured to engage the female threads.

11. A fuel line of a turbomachine, comprising:
a screw connection piece comprising a female sealing cone, and
a male sealing cone configured to fit into and form a seal with the female sealing cone and comprising a base portion, a tip portion, a recess in the tip portion, and an areal sealing element disposed in the recess,
wherein the areal sealing element comprises a metal that is softer than a material of the sealing cone, and
wherein an outer surface of the base portion and an outer surface of the areal sealing element together define an outer perimeter of a frusto-conical shape characterized by a constant external taper.

12. The fuel line as claimed in claim 11, further comprising a sleeve nut comprising female threads, wherein the screw connection piece further comprises male threads configured to engage the female threads to secure the female sealing cone and the male sealing cone together.

13. A fuel line of a turbomachine, comprising:
a screw connection piece comprising a female sealing cone, and
a male sealing cone configured to fit into and form a seal with the female sealing cone and comprising a base portion, a tip portion, a recess in the tip portion, and an areal sealing element disposed in the recess,
wherein the areal sealing element comprises a metal that is softer than a material of the sealing cone, and
wherein a radially outer surface of the base portion and a radially outer surface of the areal sealing element are flush with each other.

* * * * *